(12) United States Patent
Inagaki et al.

(10) Patent No.: US 12,285,926 B2
(45) Date of Patent: Apr. 29, 2025

(54) OPTICAL LAMINATE WITH GLASS FILM AND RESIN FILM

(71) Applicant: NITTO DENKO CORPORATION, Ibaraki (JP)

(72) Inventors: Junichi Inagaki, Ibaraki (JP); Takeshi Murashige, Ibaraki (JP); Toshihiro Kanno, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 880 days.

(21) Appl. No.: 17/433,398

(22) PCT Filed: Feb. 17, 2020

(86) PCT No.: PCT/JP2020/006031
§ 371 (c)(1),
(2) Date: Mar. 22, 2022

(87) PCT Pub. No.: WO2020/175208
PCT Pub. Date: Sep. 3, 2020

(65) Prior Publication Data
US 2022/0212448 A1 Jul. 7, 2022

(30) Foreign Application Priority Data
Feb. 28, 2019 (JP) ................... 2019-036551

(51) Int. Cl.
*G02B 5/30* (2006.01)
*B32B 7/023* (2019.01)
(Continued)

(52) U.S. Cl.
CPC ........ *B32B 17/10018* (2013.01); *B32B 7/023* (2019.01); *B32B 7/12* (2013.01);
(Continued)

(58) Field of Classification Search
CPC . G02B 1/14; G02B 1/04; G02B 5/305; G02B 1/00; G02B 5/30; G02B 5/3025;
(Continued)

(56) References Cited

U.S. PATENT DOCUMENTS

| 2013/0044282 A1 | 2/2013 | Kuwabara et al. |
| 2015/0146294 A1 | 5/2015 | Watanabe |

(Continued)

FOREIGN PATENT DOCUMENTS

| JP | 2008-265167 A | 11/2008 |
| JP | 2009-57557 A | 3/2009 |

(Continued)

OTHER PUBLICATIONS

Office Action dated Jul. 3, 2024, issued in counterpart TW application No. 109105842, with English translation. (11 pages).
(Continued)

*Primary Examiner* — Arnel C Lavarias
(74) *Attorney, Agent, or Firm* — WHDA, LLP

(57) ABSTRACT

Provided is an optical laminate in which optical defects is less likely to occur when used in an optical device such as a display. A laminate (101) includes a flexible glass film (10) having a thickness of 150 µm or less and a resin film (20) laminated on the glass film with an adhesive layer (50) interposed therebetween. The number of contaminants having a size of 100 µm or more in the adhesive layer is preferably 10/m² or less. When the contaminants protrude from the surface of the adhesive layer (50), the height and inclination angle of protrusions is preferably small.

13 Claims, 2 Drawing Sheets

(51) Int. Cl.
*B32B 7/12* (2006.01)
*B32B 17/10* (2006.01)
*G02B 1/04* (2006.01)
*G02B 1/14* (2015.01)

(52) U.S. Cl.
CPC .......... *B32B 17/10458* (2013.01); *G02B 1/04* (2013.01); *G02B 1/14* (2015.01); *G02B 5/305* (2013.01); *B32B 2250/02* (2013.01); *B32B 2307/412* (2013.01); *B32B 2307/418* (2013.01); *B32B 2307/42* (2013.01); *B32B 2307/732* (2013.01); *B32B 2457/20* (2013.01)

(58) Field of Classification Search
CPC ............. G02B 5/3033; G02B 5/3041; G02B 27/0006; B32B 17/10018; B32B 7/023; B32B 7/12; B32B 17/10458; B32B 2250/02; B32B 2307/412; B32B 2307/418; B32B 2307/42; B32B 2307/732; B32B 2457/20; B32B 2457/202; B32B 2457/204; B32B 2457/206; B32B 2457/208
USPC ......... 359/483.01, 507, 513, 489.01, 489.07; 428/40.1, 41.7, 41.8, 98, 426
See application file for complete search history.

(56) References Cited

U.S. PATENT DOCUMENTS

| | | | |
|---|---|---|---|
| 2017/0282506 | A1 | 10/2017 | Matsuno et al. |
| 2018/0203173 | A1 | 7/2018 | Murashige et al. |
| 2021/0122143 | A1 | 4/2021 | Yamashita et al. |

FOREIGN PATENT DOCUMENTS

| | | | | | |
|---|---|---|---|---|---|
| JP | 2013-123833 | A | | 6/2013 | |
| JP | 2015-089546 | A | | 5/2015 | |
| JP | 2016-222396 | A | | 12/2016 | |
| JP | 2017-24177 | A | | 2/2017 | |
| JP | 2017-039227 | A | | 2/2017 | |
| KR | 2018/0034709 | A | | 4/2018 | |
| KR | 20180103428 | A | * | 9/2018 | |
| WO | 2010/041513 | A1 | | 4/2010 | |
| WO | 2013/175767 | A1 | | 11/2013 | |
| WO | 2014/084046 | A1 | | 6/2014 | |
| WO | WO-2014171504 | A1 | * | 10/2014 | ........... B32B 17/064 |
| WO | 2017/205106 | A1 | | 11/2017 | |
| WO | 2018/221374 | A1 | | 12/2018 | |

OTHER PUBLICATIONS

Office Action dated Apr. 30, 2024, issued in counterpart TW application No. 109105842, with English translation. (7 pages).
Decision of Refusal dated Aug. 8, 2023, issued in counterpart CN Application No. 202080017472.1. (8 pages).
Office Action dated Sep. 29, 2023, issued in counterpart JP Application No. 2021-501978, with English Translation. (16 pages).
Office Action dated Aug. 24, 2023, issued in counterpart TW Application No. 109105842. (9 pages).
The Extended European Search Report dated Oct. 12, 2022, issued in counterpart EP Application No. 20762437.0. (9 pages).
Notification of Transmittal of Translation of the International Preliminary Report on Patentability (Form PCT/IB/338) issued in counterpart International Application No. PCT/JP2020/006031 mailed Sep. 10, 2021 with Forms PCT/IB/373 and PCT/ISA/237. (10 pages).
International Search Report dated Mar. 10, 2020, issued in counterpart International Application No. PCT/JP2020/006031, with English Translation. (4 pages).
Office Action dated Jan. 10, 2023, issued in counterpart CN application No. 202080017472.1. (13 pages).
Office Action dated Dec. 10, 2024, issued in counterpart KR Application No. 10-2021-7027332, with English translation. (17 pages).
Office Action dated Jan. 9, 2025, issued in counterpart EP Application No. 20762437.0. (7 pages).

* cited by examiner $\theta = arctan(2H/\Phi)$

OPTICAL LAMINATE WITH GLASS FILM AND RESIN FILM

TECHNICAL FIELD

The present invention relates to an optical laminate in which a flexible glass film and a resin film are laminated.

BACKGROUND ART

Optical devices such as display devices, lighting devices and solar cells are becoming lighter and thinner. For meeting these requirements, replacement of glass materials with plastic materials is also in progress, but it is difficult for plastic materials to impart high impact resistance and glossiness (glare feeling) like glass.

Thus, it has been proposed to use a thin glass film having flexibility for reducing the weight and the thickness of a device while taking advantage of glass. Patent Document 1 proposes an optical laminate in which a glass film is bonded to a polarizing plate with an adhesive layer interposed therebetween. Since an optical laminate obtained using a flexible glass film can also be applied to a roll-to-roll process, not only reduction of the thickness and the weight of the device are reduced, but also improvement of productivity and reduction of cost of the device and constituent members can be expected.

PRIOR ART DOCUMENT

Patent Document

Patent Document 1: Japanese Patent Laid-open Publication No. 2017-24177

SUMMARY OF THE INVENTION

Problems to be Solved by the Invention

Optical laminates obtained using a glass film have been put into practical use at a laboratory level, but have not been put into practical use as mass production products by a roll-to-roll process, and problems in mass production have not been clarified. The present inventors prepared the optical laminate described in Patent Document 1 by a roll-to-roll process and applied the optical laminate to a display device, and resultantly, it was found that there were many optical defects.

In view of the above, an object of the present invention is to provide an optical laminate with few optical defects.

Means for Solving the Problems

The optical laminate of the present invention includes a flexible glass film having a thickness of 150 μm or less, and a resin film bonded onto a first principal surface of the glass film with an adhesive layer interposed therebetween. The optical laminate may include a polarizer as a resin film.

In one embodiment of the optical laminate, the number of contaminants of 100 μm or more in the adhesive layer is 10/m$^2$ or less. The number of contaminants of 5 μm or more and less than 100 μm in the adhesive layer is preferably 1300/m$^2$ or less.

The difference in refractive index between the adhesive layer and the contaminant in the adhesive layer is preferably small. The number of contaminants of 100 μm or more in the adhesive layer, whose refractive index is different from that of the adhesive layer by more than 0.02, is preferably 5/m$^2$ or less.

In another embodiment of the optical laminate, on the resin film surface, the height and/or the inclination angle of a projection formed by the contaminant in the adhesive layer are preferably small. For reducing the height and/or the inclination angle of the projection on the resin film surface, the protrusion height of the contaminant protruding to the resin film-side surface and the inclination angle of the protrusion are preferably small.

The number of contaminants in which the height of the protrusion from the resin film-side surface of the adhesive layer is 7 μm or more is preferably 10/m$^2$ or less. More preferably, the number of contaminants in which the height of the protrusion on the resin film-side surface of the adhesive layer is 5 μm or more is 10/m$^2$ or less.

The number of contaminants in which the inclination angle of the protrusion from the surface on the resin film-side of the adhesive layer is 10° or more is preferably 10/m$^2$ or less. More preferably, the number of contaminants in which the inclination angle of the protrusion from the resin film-side surface of the adhesive layer is 3° or more is 10/m$^2$ or less.

The number of contaminants in which the height of the protrusion from the resin film-side surface of the adhesive layer is 7 μm or more or the inclination angle of the protrusion is 10° or more is preferably 10/m$^2$ or less. More preferably, the number of contaminants in which the height of the protrusion from the resin film-side surface of the adhesive layer is 5 μm or more or the inclination angle of the protrusion is 3° or more is 10/m$^2$ or less.

Effects of the Invention

The optical laminate of the present invention has few contaminant defects between the glass film and the resin film. Thus, there are few optical defects, and a high yield can be achieved when the optical laminate is used for formation of an optical device or the like.

MODE FOR CARRYING OUT THE INVENTION

The optical laminate of the present invention includes a resin film on one surface of a glass film. The glass film is bonded to the resin film with an adhesive layer interposed therebetween.

Figure 1:
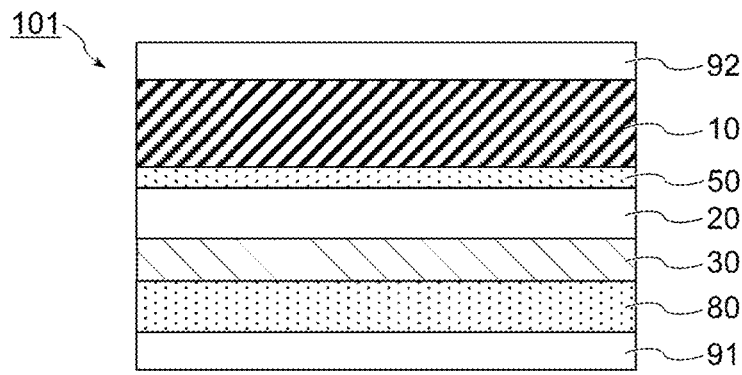
FIG. 1 is a sectional view showing an example of a stacking configuration of an optical laminate.

FIG. 1 is a sectional view showing an example of a stacking configuration of an optical laminate, where a transparent resin film 20 is bonded to one surface (first principal surface) of a glass film 10 with an adhesive layer 50 interposed therebetween, and a polarizer 30 is bonded to the transparent resin film 20. Both the transparent resin film 20 and the polarizer 30 correspond to a resin film. An optical laminate 101 shown in FIG. 1 includes a pressure sensitive adhesive layer 80 on a polarizer 30, and a separator 91 is temporarily attached to the surface of the pressure sensitive adhesive layer 80. A surface protective film 92 is temporarily attached to the other surface (second principal surface) of the glass film 10.

<Glass Film>

The glass film 10 is a sheet-shaped glass material having flexibility. Examples of glass materials that form the glass film 10 include soda-lime glass, borate glass, aluminosilicate glass and quartz glass. The content of alkali metal components (e.g., $Na_2O$, $K_2O$ and $Li_2O$) of the glass material is preferably 15% by weight or less, more preferably 10% by weight or less.

For imparting flexibility, the thickness of the glass film is preferably 150 μm or less, more preferably 120 μm or less, further preferably 100 μm or less. For imparting strength, the thickness of the glass film is preferably 10 μm or more, more preferably 25 μm or more, further preferably 40 μm or more, especially preferably 50 μm or more. The light transmittance of the glass film 10 at a wavelength of 550 nm is preferably 85% or more, more preferably 90% or more. Similarly to a general glass material, the glass film 10 has a density of about 2.3 to 3 $g/cm^3$.

The method for forming the glass film 10 is not particularly limited, and any appropriate method can be employed. For example, a mixture containing a main raw material such as silica or alumina, an antifoaming agent such as sodium sulfate or antimony oxide, and a reducing agent such as carbon is melted at a temperature of 1400 to 1600° C., formed into a sheet shape, and then cooled to prepare a glass film. Examples of methods for forming glass into a sheet shape include a slot down draw method, a fusion method and a float method.

The glass film 10 may be a sized sheet or may have a long shape. It is preferable that the glass film has a long shape from the viewpoint of being applicable to a roll-to-roll process and improving productivity of a device and constituent members thereof (e.g., the later-described optical laminate). Since the glass film has flexibility, the long glass film is provided as a roll. The length of the long glass film is preferably 100 m or more, more preferably 300 m or more, further preferably 500 m or more. The width of the long glass film is, for example, 50 to 3000 mm, preferably 100 to 2000 mm.

As the glass film 10, commercially available thin glass may be used. Examples of the commercially available thin glass include "7059", "1737" and "EAGLE2000" manufactured by Corning Incorporated, "AN100" manufactured by Asahi Glass Co., Ltd., "NA-35" manufactured by NH Techno Glass Corporation, "OA-10" manufactured by Nippon Electric Glass Company, Limited, and "D263" and "AF45" manufactured by Schott AG.

<Resin Film>

A resin film is disposed on one principal surface of the glass film 10 with an adhesive layer 50 interposed therebetween. In the optical laminate 101 shown in FIG. 1, the transparent resin film 20 is provided as a resin film, and a polarizer 30 is disposed on the transparent resin film. By disposing the transparent resin film 20 between the glass film 10 and the polarizer 30, the durability of the polarizer 30 tends to be improved. When the transparent resin film 20 is disposed between the glass film 10 and the polarizer 30, durability against impact from the surface of the glass film 10 tends to be improved.

The material of the transparent resin film 20 is not particularly limited. From the viewpoint of, for example, imparting durability to the polarizer and improving the impact resistance of the optical laminate, the material of the transparent resin film is preferably a resin material, and in particular, a thermoplastic resin excellent in transparency, mechanical strength, heat stability and moisture barrier property is preferably used. Specific examples of the resin include cellulose resins such as triacetyl cellulose, polyester-based resins, polyethersulfone resins, polysulfone resins, polycarbonate resins, polyamide resins, polyimide resins, polyolefin resins, (meth)acryl resins, cyclic polyolefin resins (norbornene-based resins), polyarylate resins, polystyrene resins, polyvinyl alcohol resins and mixtures thereof.

The thickness of the transparent resin film 20 is preferably 5 to 100 μm, more preferably 10 to 60 μm, further preferably 20 to 50 μm. The transparent resin film 20 may be an optically isotropic film or an optically anisotropic film.

The Young's modulus of the transparent resin film 20 at 23° C. is preferably 1.5 to 10 GPa, more preferably 1.8 to 9 GPa. When the thickness and the Young's modulus of the transparent resin film are within the above-described ranges, the impact resistance of the optical laminate tends to be improved. The fracture toughness value of the transparent resin film 20 at 25° C. is preferably 1.5 to 10 MPa $m^{1/2}$, more preferably 2 to 6 MPa $m^{1/2}$. A transparent resin film, whose fracture toughness value falls within the above-described range, has sufficient toughness, and therefore can improve the flexibility of the optical laminate by reinforcing the glass film to suppress cracking and breakage.

As the polarizer 30, a film which exhibits absorption dichroism at any wavelength in the visible light region is used. Single transmittance of the polarizer 30 is preferably 40% or more, more preferably 41% or more, further preferably 42% or more, especially preferably 43% or more. The polarization degree of the polarizer 30 is preferably 99.8% or more, more preferably 99.9% or more, further preferably 99.95% or more.

As the polarizer 30, any appropriate polarizer can be adopted according to a purpose. Examples thereof include hydrophilic polymer films such as polyvinyl alcohol-based films, partially formalized polyvinyl alcohol-based films and ethylene-vinyl acetate copolymer-based partially saponified films which are uniaxially stretched with a dichroic substance such as iodine or a dichroic dye adsorbed, and polyene-based oriented films such as dehydrated products of polyvinyl alcohol and dehydrochlorinated products of polyvinyl chloride. In addition, guest-host-type polarizers obtained by unidirectionally orienting a liquid-crystalline composition containing a dichroic substance and a liquid-crystalline compound as disclosed in U.S. Pat. No. 5,523,863 etc., E-type polarizers obtained by uniaxially orienting a lyotropic liquid crystal as described in U.S. Pat. No. 6,049,428 etc., and the like can be used.

Among these polarizers, polyvinyl alcohol-based (PVA)-based polarizers obtained by adsorbing a dichroic substance such as iodine or dichroic dye to a polyvinyl alcohol-based film such as a polyvinyl alcohol film or a partially formalized polyvinyl alcohol film, and uniaxially orienting the film are preferably used because these polarizers have a high polarization degree. For example, a PVA-based film is iodine-stained and stretched to obtain a PVA-based polarizer.

The thickness of the polarizer 30 is, for example, about 1 to 80 μm. The thickness of the polarizer 30 may be 3 μm or more or 5 μm or more. As the polarizer 30, a thin polarizer having a thickness of 25 μm or less, preferably 15 μm or less, more preferably 10 μm or less can be used. By using a thin polarizer a thin optical laminate can be obtained.

<Adhesive Layer>

The glass film 10 is bonded to the transparent resin film 20 with the adhesive layer 50 interposed therebetween. The adhesive may be a curable adhesive that is cured by heat energy, light energy or the like, or may be a pressure sensitive adhesive.

Examples of the material that forms the curable adhesive include thermosetting resins and active energy ray-curable resins. Specific examples of the resins include epoxy-based resins, silicone-based resins, acryl-based resins, polyurethane, polyamide, polyether and polyvinyl alcohol. As the pressure sensitive adhesive, one having an acryl-based polymer, a silicone-based polymer, polyester, polyurethane, polyamide, polyether, a fluorine-based polymer, a rubber-based polymer or the like as a base polymer can be appropriately selected. The adhesive may contain a polymerization initiator, a crosslinker, an ultraviolet absorber, a silane coupling agent, and the like.

For achieving high adhesiveness with a small thickness, the adhesive constituting the adhesive layer 50 is preferably a thermosetting or active energy ray-curable adhesive, and in particular, an adhesive containing an epoxy-based resin is preferable. By bonding a glass film to a resin film with an epoxy-based resin-containing adhesive interposed therebetween, glass film is hardly broken, and thus an optical laminate having further improved impact resistance can be obtained.

The thickness of the adhesive layer 50 is preferably 10 μm or less, more preferably 0.05 to 8 μm, further preferably 0.1 to 7 μm. When the thickness of the adhesive layer 50 used for bonding the glass film and the transparent film is within the above-described range, breakage of the glass film is suppressed, and thus an optical laminate excellent in impact resistance can be obtained.

The method for curing the adhesive can be appropriately selected according to the type of the adhesive. When the adhesive is a photocurable adhesive, curing is performed by ultraviolet irradiation. The conditions for ultraviolet irradiation can be appropriately selected according to type of the adhesive, the composition of the adhesive composition, and the like. The accumulated amount of light is, for example, 100 to 2000 mJ/cm². When the adhesive is a thermosetting adhesive, curing is performed by heating. The heating conditions can be appropriately selected according to type of the adhesive, the composition of the adhesive composition, and the like. For the heating conditions, for example, the temperature is 50° C. to 200° C., and the heating time is about 30 seconds to 30 minutes.

<Contaminant in Adhesive Layer>

Figure 2:
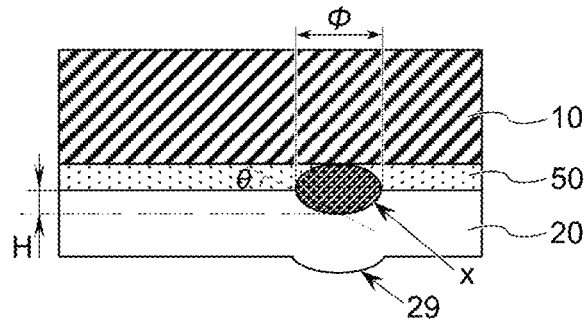
FIG. 2 is a schematic view showing a projection formed on a surface of a resin film by a contaminant in an adhesive layer.

In an optical laminate in which a glass film is bonded to a resin film with an adhesive layer interposed therebetween, a contaminant may be present in the adhesive layer. The contaminant in the adhesive layer can be an optical defect. For example, when a large contaminant is contained in the adhesive layer, transmitted light and reflected light may be refracted, scattered and reflected by the contaminant, resulting in image failure in a liquid crystal display, an OLED display or the like. In addition, even in applications of lightings, smart windows and the like, visible contaminant is an optical defect. As shown in FIG. 2, when the size of a contaminant x present in the adhesive layer 50 is large, the contaminant x protrudes from the surface of the adhesive layer 50, so that the surface of the resin film 20 is deformed, resulting in formation of a projection 29. If such a projection is formed, light may be refracted, scattered or reflected, leading to deterioration of visibility of a display device or occurrence of brightness unevenness in lighting.

In a first aspect, the number of contaminants of 100 μm or more, which are contained in the adhesive layer 50 of the optical laminate, is 10/m² or less in the present invention. Existence or non-existence of contaminants is examined by visual observation of the optical laminate. The visually recognized contaminants are observed with an optical microscope, and the number of contaminants having a maximum diameter of 100 μm or more is defined as the number of contaminants of 100 μm or more.

Since contaminants of 100 μm or more, which are contained in the adhesive layer 50, are visually recognized as optical defects, the number of contaminants of 100 μm or more is preferably as small as possible. The number of contaminants of 100 μm or more is preferably 7/m² or less, more preferably 5/m² or less, further preferably 3/m² or less, particularly preferably 2/m² or less. The number of contaminants of 100 μm or more is ideally less than 1/m². The number of contaminants of 150 μm or more is ideally 0/m².

When a contaminant is contained in the adhesive layer, it is visually recognized as an optical defect because light is refracted, scattered and reflected at the interface between the contaminant and the adhesive as described above. When the difference in refractive index between the contaminant and the adhesive is small, refraction, scattering and reflection of light at the interface are small. Thus, even if a contaminant is contained in the adhesive layer, it is unlikely to be visually recognized as an optical defect when the difference in refractive index between the contaminant and the adhesive is small. The difference in refractive index between the contaminant contained in the adhesive layer and the adhesive is preferably 0.02 or less.

The number of contaminants of 100 μm or more in the adhesive layer, whose refractive index is different from that of the adhesive layer by more than 0.02, is preferably 5/m² or less, more preferably 3/m² or less, further preferably 2/m² or less. The number of contaminants of 100 μm or more, whose refractive index is different from that of the adhesive by more than 0.02, is ideally less than 1/m². The refractive index is a measured value at a wavelength of 590 nm. The refractive index of the contaminant in the adhesive layer may be specified by identifying a substance of the contaminant by infrared microspectroscopy or the like and applying a refractive index of a known substance.

The number of contaminants of less than 100 μm in the adhesive layer 50 is not particularly limited. However, when the number of contaminants having of less than 100 μm increases, the number of coarse contaminants of 100 μm or more tends to increase. For setting the number of contaminants of 100 μm or more within the above-mentioned range, the number of contaminants of 5 μm or more is preferably 1300/m² or less, more preferably 1000/m² or less, further preferably 800/m² or less, particularly preferably 600/m² or less. In addition, even in the case of contaminants of 100 μm or less, the contaminants may be optical defects when the contaminants are present at a high density, thus the number of the contaminants is preferably within the above-described range.

Among contaminants of 5 μm or more and less than 100 μm, contaminants of more than 50 μm and less than 100 μm may be visually recognized as optical defects in applications of display devices and the like. Thus, the number of contaminants of more than 50 μm and less than 100 μm in the adhesive layer 50 is preferably 300/m² or less, more preferably 200/m² or less, further preferably 150/m² or less.

In a second aspect, the number of projections on a surface of the resin film formed due to contaminants contained in the adhesive layer 50 of the optical laminate of the present invention is preferably small. As shown in FIG. 2, when the contaminant x in the adhesive layer 50 protrudes from the surface of the adhesive layer 50, the surface of the resin film 20 is deformed, resulting in formation of the projection 29. The projection formed on the surface of the resin film 20 acts like a lens to refract light, and is therefore likely to cause poor visibility, and larger the height of the projection, the higher the possibility that poor visibility occurs.

The height of the projection on the surface of the resin film 20 tends to increase as the height H of the contaminant protruding from the surface of the adhesive layer 50 becomes larger. In particular, when the protrusion height H of the contaminant protruding from the surface of the adhesive layer is 7 μm or more, poor visibility is likely to occur. Thus, the number of contaminants x having a protrusion height H of 7 μm or more is preferably 10/m² or less from the surface of the adhesive layer. The number of contaminants having a protrusion height H of 7 μm or more is more preferably 7/m² or less, further preferably 5/m² or less, particularly preferably 3/m² or less, most preferably 2/m² or less. The number of contaminants having a protrusion height H of 7 μm or more is ideally less than 1/m².

In a display such as a liquid crystal display or an OLED display, even refraction of light by a smaller projection tends to be visually recognized as an optical defect. Thus, when the optical laminate is used for displays, the number of contaminants having a protrusion height H of 5 μm or more from the surface of the adhesive layer 50 is preferably 10/m² or less, more preferably 7/m² or less, further preferably 5/m² or less, particularly preferably 3/m² or less, most preferably 2/m² or less. The number of contaminants having a protrusion height H of 5 μm or more is ideally less than 1/m².

Figure 4A:
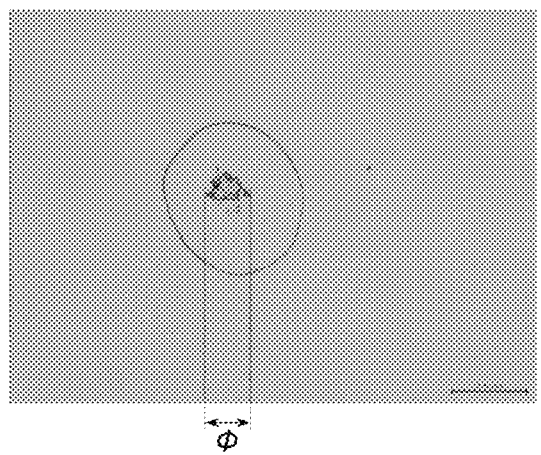
FIG. 4A is an optical microscope photograph of a contaminant contained in an adhesive layer.
Figure 4B:
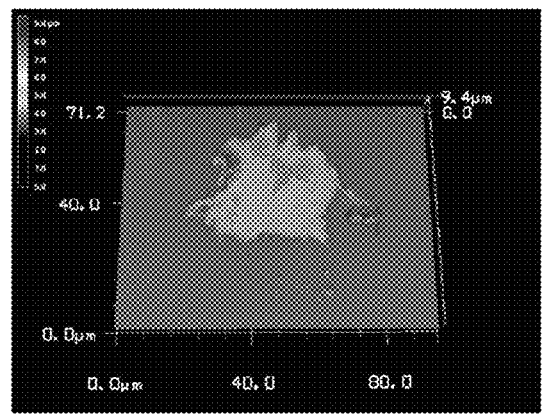
FIG. 4B shows a three-dimensional surface shape of a contaminant protruding from the surface of the adhesive layer and the vicinity thereof.

The protrusion height H of the contaminant from the surface of the adhesive layer 50 is determined on the basis of the three-dimensional surface shape of the adhesive layer measured by vertical scanning low coherence interferometry (ISO 25178) (see FIG. 4B). In the measurement of the three-dimensional surface shape of the adhesive layer, a sample is used in which the resin film 20 is removed by performing delamination at an interface between the adhesive layer 50 and the resin film 20 by immersion in water, heating or the like.

The shape of the contaminant protruding from the adhesive layer 50 can also be evaluated on the basis of the inclination angle of the protrusion. As the inclination angle θ of the contaminant protruding from the surface of the adhesive layer 50 becomes larger, the inclination angle of the projection 29 formed on the surface of the resin film 20 arranged on the adhesive layer becomes larger, so that the contaminant is more likely to be visually recognized as an optical defect. In particular, when the inclination angle θ of the protrusion contaminant is 10° or more, poor visibility is likely to occur. Therefore, the number of contaminants in which the inclination angle θ of the protrusion from the surface of the adhesive layer 50 is 10° or more is preferably 10/m² or less. The number of contaminants having an inclination angle θ of 10° or more is more preferably 7/m² or less, further preferably 5/m² or less, particularly preferably 3/m² or less, most preferably 2/m² or less. The number of contaminants in which the inclination angle θ of the protrusion is 10° or more is ideally less than 1/m².

In a display such as a liquid crystal display or an OLED display, even refraction of light by a projection having a smaller inclination angle tends to be visually recognized as an optical defect. Thus, when the optical laminate is used for displays, the number of contaminants in which the inclination angle of the protrusion from the surface of the adhesive layer 50 is 3° or more is preferably 10/m² or less, more preferably 7/m² or less, further preferably 5/m² or less, particularly preferably 3/m² or less, most preferably 2/m² or less. The number of contaminants in which the inclination angle θ of the protrusion is 3° or more is ideally less than 1/m².

Figure 3:
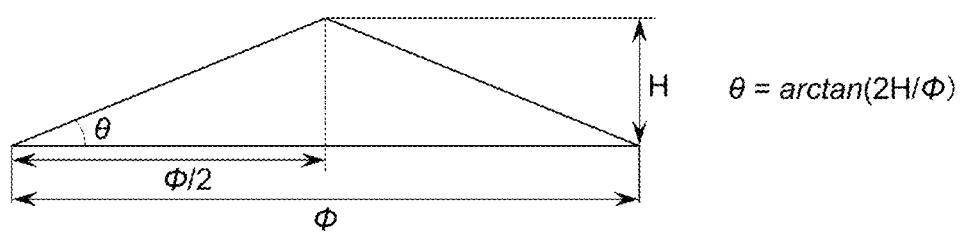
FIG. 3 is an explanatory view of a method for calculating an inclination angle θ of a protrusion.

As shown in FIG. 3, the inclination angle θ of the protrusion of the contaminant is calculated by approximating the cross-sectional shape of the protrusion to an isosceles triangle having a base length φ and a height H. The inclination angle θ of the protrusion (the bottom angle of the isosceles triangle) is expressed by arctan (2H/φ). The length φ of the base is equal to the size (maximum diameter) of the contaminant, and is determined by observing the optical laminate with an optical microscope.

When the projection is formed on the surface of the resin film 20 by the contaminant in the adhesive layer 50, from the viewpoint of suppressing occurrence of optical defects caused by the projection, it is preferable that the protrusion height H of the contaminant x which causes the formation of the projection and the inclination angle θ of the protrusion are small. It is preferable that the protrusion of the contaminant x in the adhesive layer 50 has a height H of 7 μm or less and an inclination angle θ of 10° or less. Thus, the number of contaminants having a protrusion height H of 7 μm or more and/or an inclination angle θ of 10° or more from the surface of the adhesive layer 50 is preferably 10/m² or less, more preferably 7/m² or less, further preferably 5/m² or less, particularly preferably 3/m² or less, most preferably 2/m² or less. The number of contaminants having a protrusion height H of 7 μm or more and/or an inclination angle θ of 10° or more is ideally less than 1/m².

In a display such as a liquid crystal display or an OLED display, even refraction of light by a projection having a small height or a small inclination angle tends to be visually recognized as an optical defect. Thus, when the optical laminate is used for displays, the number of contaminants having a protrusion height H of 5 μm or more and/or an inclination angle θ of 3° or more from the surface of the pressure sensitive adhesive layer 50 is preferably 10/m² or less, more preferably 7/m² or less, further preferably 5/m² or less, particularly preferably 3/m² or less, most preferably 2/m² or less. The number of contaminants having a protrusion height H of 5 μm or more and/or an inclination angle θ of 3° or more is ideally less than 1/m².

<Control of Number of Contaminants in Adhesive Layer>

In an optical laminate in which a resin film is bonded onto a glass film with an adhesive layer interposed therebetween, most of contaminants in the adhesive layer are derived from deposited contaminants on a surface of the glass film. Production of glass films is often performed in an environment with lower cleanliness as compared to production of optical devices such as display devices and production of members for optical devices. Thus, a large number of contaminants are deposited on the glass film immediately after production. For reducing the number of contaminants in the adhesive layer, it is preferable to clean the glass film in a clean environment and laminate the resin film on a surface of the cleaned glass film.

The method for cleaning the glass film is not particularly limited as long as the number of deposited contaminants can be reduced to the above-described range, and the method may be either a dry method or a wet method. Examples of the dry method include spraying of air, decomposition of contaminants by irradiation with UV, ozone or the like, removal of contaminants by a pressure sensitive adhesive roll or a pressure sensitive adhesive sheet, brush cleaning, blast cleaning and the like. Examples of the wet cleaning include cleaning with a cleaning liquid such as pure water, an acid, an alkali or an organic solvent, cleaning with a brush or a sponge in a state where a liquid such as a cleaning liquid is deposited on a surface of the glass film or in a state where the glass film is immersed in the liquid, ultrasonic cleaning and two-fluid cleaning.

Since glass has high surface free energy and high adhesion of deposited contaminants, it may be impossible to sufficiently remove contaminants only by contact with liquid. In addition, since deposited contaminants ascribed to an environment for production of the glass film contain a variety of substances, it may be impossible to sufficiently remove the contaminants even by a method in which contaminants are dissolved in an organic solvent or the like. In cleaning of a glass plate for display devices, a method is known in which the surface layer of glass is dissolved in a strong alkali to remove deposited contaminants. This method has a high contaminant removing effect, but can cause a decrease in strength due to a decrease in the thickness when applied to the glass film.

Since the glass film has higher hardness than the plastic film and is less likely to be scratched, a method of removing deposited contaminants by physical impact force can be applied for cleaning the glass film. In particular, brush cleaning or blast cleaning is preferable as dry cleaning and two-fluid cleaning is preferable as wet cleaning because deposited contaminants can be moderately removed.

For the brush cleaning, one such as a contact-type web cleaner equipped with a rotatable brush is used. When the surface cleaning is continuously performed while the glass film is conveyed in a roll-to-roll manner, from the viewpoint of maintaining the cleaning quality constant, a cleaner equipped with a facility for removing contaminants deposited on the brush by a suction method or the like is preferable.

Dry ice blasting is preferable as blast cleaning. In dry ice blasting, a dry ice pellet is sprayed onto a glass film at a high speed. When dry ice enters between the glass film and the deposited contaminant followed by rapid vaporization, the deposited contaminant can be peeled and removed due to the rapid volume change by the vaporization. In addition, since dry ice sublimizes, the blasting particles do not remain as contaminants.

The two-fluid cleaning is a treatment in which a mixed fluid of a gas and a liquid is supplied from a two-fluid nozzle to a surface of a glass film. Droplets in the mixed fluid collide against the surface of the glass film, and contaminants deposited on the surface of the glass film can be removed by the impact. As the liquid and the gas for the two-fluid cleaning, water and air are generally used. As the gas (carrier gas), nitrogen, oxygen, carbon dioxide, hydrogen, ozone, argon or the like may be used. It is preferable that the two-fluid nozzle has a carrier gas pressure of about 0.1 to 0.6 MPa and a liquid pressure of about 0.05 to 0.5 MPa.

It is preferable that the cleaning is performed continuously while the glass film is conveyed in a roll-to-roll manner. The cleaning may be performed on only one surface of the glass film, or both surfaces of the glass film may be cleaned. When only one surface is cleaned, the surface (first principal surface) on which the resin film is to be laminated may be cleaned. When both surfaces of the glass film are cleaned, the method for cleaning one surface and the method for cleaning the other surface may be the same or different.

When cleaning is performed in a roll-to-roll manner, the cleaning may be performed off-line or in-line. In the in-line cleaning, a resin film is laminated on the surface of the cleaned glass film with an adhesive layer interposed therebetween after the glass film is cleaned and before the glass film is wound into a roll. In the off-line cleaning, the cleaned glass film is once wound into a roll. Before the cleaned glass film is wound into a roll, a protective film may be temporarily attached for the purpose of, for example, preventing redeposition of contaminants on the cleaned surface.

<Lamination of Glass Film and Resin Film>

An optical laminate is obtained by laminating a resin film on the cleaned glass film 10 with the adhesive layer 50 interposed therebetween. When the glass film 10 has a long shape, it is preferable to perform lamination while convening the glass film by a roll-to-roll manner.

When a plurality of resin films are laminated on the first principal surface of the glass film 10, the order of lamination in formation of the optical laminate is not particularly limited. For example, the transparent resin film 20, the polarizer 30 and the like may be sequentially laminated on the glass film 10, or a stacked film (e.g. a laminate of the transparent resin film 20 and the polarizer 30) obtained by stacking a plurality of resin films in advance and the glass film 10 may be laminated. It is preferable that the transparent resin film 20 and the polarizer 30 are stacked with an adhesive layer (not shown) interposed therebetween. As the adhesive disposed between the transparent resin film and the polarizer 30, the adhesive exemplified above may be used as the adhesive constituting the adhesive layer 50.

<Additional Layer>

The optical laminate may include an additional layer other than the glass film 10, the adhesive layer 50 and the resin films 20 and 30. For example, the optical laminate 101 may include a pressure sensitive adhesive layer 80 for bonding to other members constituting the device. For example, the optical laminate 101 can be bonded to an image display cell such as an OLED cell or a liquid crystal cell with the pressure sensitive adhesive layer 80 interposed therebetween. The pressure sensitive adhesive that forms the pressure sensitive adhesive layer 80 is not particularly limited, and one having an acryl-based polymer, a silicone-based polymer, polyester, polyurethane, polyamide, polyether, a fluorine-based polymer, a rubber-based polymer or the like as a base polymer can be appropriately selected. In particular, the pressure sensitive adhesive is preferably one that is excellent in transparency, has moderate wettability, cohesiveness and adhesiveness, and is excellent in weather resistance, heat resistance and the like, such as an acryl-based pressure sensitive adhesive.

The pressure sensitive adhesive layer 80 may be a laminate of two or more layers. The thickness of the pressure sensitive adhesive layer 80 is, for example, about 1 to 300 μm, preferably 5 to 50 μm, more preferably 10 to 30 μm.

Preferably, a separator 91 is temporarily attached on a surface of the pressure sensitive adhesive layer 80. The separator 91 protects the surface of the pressure sensitive adhesive layer 80 until the optical laminate is bonded to another component. As a constituent material for the separator 91, a plastic film such an acrylic film, a polyolefin film, a cyclic polyolefin film or a polyester film is preferably used.

The thickness of the separator 91 is normally about 5 to 200 μm, preferably 10 to 60 μm, more preferably 15 to 40 μm, further preferably 20 to 30 μm. Preferably, the surface of the separator 91 is subjected to release treatment.

Examples of the release agent include silicone-based materials, fluorine-based materials, long-chain alkyl-based materials and fatty acid amide-based materials. The film used as the base material for forming the pressure sensitive adhesive layer 80 may be used as a separator as it is.

As shown in FIG. 1, a surface protective film 92 may be temporarily attached on the second principal surface of the glass film 10. The surface protective film 92 protects the glass film and the like until the optical laminate is used. Since the surface protective film 92 is temporarily attached to the surface of the glass film 10, for example, generation of scratches, holes and the like can be prevented even when an object with a sharp tip falls onto the optical laminate.

As a material for the surface protective film 92, a plastic material similar to that for the separator 91 is preferably used, and examples thereof include polyethylene terephthalate and polyethylene. Preferably, the surface protective film 92 has a pressure sensitive adhesive layer on a surface to be attached to the glass film. As the surface protective film 92, a self-pressure sensitive adhesive film obtained by laminating a film-forming resin layer and a pressure sensitive adhesive layer by coextrusion may be used. The thickness of the surface protective film 92 is, for example, about 20 μm to 1000 μm, preferably 30 to 500 μm, more preferably 40 to 200 μm, further preferably 50 to 150 μm.

Although FIG. 1 shows the optical laminate 101 in which the transparent resin film 20 and the polarizer 30 are laminated as resin films on the first principal surface of the glass film 10, the resin film may be monolayer. For example, the polarizer may be bonded to the first principal surface of the glass film with an adhesive layer interposed therebetween. Alternatively, only the transparent resin film may be laminated on the first principal surface of the glass film.

The optical laminate may include another resin film or the like between the polarizer 30 and the pressure sensitive adhesive layer 80. By disposing the transparent film between the polarizer 30 and the pressure sensitive adhesive layer 80, the durability of the polarizer can be further improved. The material, thickness, optical characteristics, and the like of the transparent film disposed between the polarizer 30 and the pressure sensitive adhesive layer 80 may the same as those of the transparent resin film 20 disposed between the polarizer 30 and the glass film 10. The transparent film may be an optically isotropic film or an optically anisotropic film. Disposing an optically anisotropic film between the polarizer 30 and the pressure sensitive adhesive layer 80 may enable exhibition of various functions.

For example, when the optical laminate is laminated on a surface of an OLED cell, and the transparent film and the polarizer 30 constitute a circularly polarizing plate, external light reflected by metal electrodes of an OLED element cell, etc. can be blocked to improve visibility of display. The transparent film may be an obliquely stretched film.

When the optical laminate is laminated on a surface of a liquid crystal cell, various optical compensations can be performed by an optically anisotropic film. The type of the optically anisotropic film used for optical compensation may be appropriately selected according to the type of the liquid crystal cell or the like.

The optical laminate may have various functional layers other than those described above. Examples of the functional layer include antireflection layers, antifouling layers, light diffusion layers, easily-adhesive layers and antistatic layers.

The glass film may be subjected to a decorative printing. The print thickness in the decorative printing is, for example, about 5 to 100 μm. The decorative printing may be performed on any surface of the glass film. In addition, a decorative printing may be performed on a constituent member of the optical laminate other than the glass film. For example, a decorative print may be applied to the polarizer 30 or the transparent resin film 20. By laminating a transparent film having a decorative printing (decorative printed film) to a constituent member of the optical laminate by a roll-to-roll manner, an optical laminate having a decorative printed portion can also be obtained.

The optical laminate having the resin film laminated on the first principal surface of the glass film 10 exhibits high hardness due to the glass film. In addition, since the optical laminate includes the resin film laminated on the first principal surface of the glass film 10, breakage of the glass film 10 is prevented thereby exhibiting excellent impact resistance. This is supposed to be because impacts applied to the second principal surface of the glass film can be effectively released to the first principal surface-side. Impact resistance is remarkably improved particularly when the polarizer 30 is disposed on the first principal surface of the glass film 10 with the transparent resin film 20 interposed therebetween. In addition, since the glass film is hardly broken, it is possible to decrease the thickness of the glass film, and the weight of the optical laminate can be accordingly reduced.

Further, a glass material has high moisture and gas shielding properties, high durability against organic solvents, acids, alkalis and the like, and excellent heat resistance. Therefore, by disposing the glass film 10 on the surface, protection performance for the polarizer 30 can be improved to prevent degradation of the polarizer as compared to a case where only the resin film 20 is present.

The optical laminate of the present invention may be a sized sheet or may have a long shape. It is preferable that the optical laminate has a long shape from the viewpoint of being applicable to a roll-to-roll process and improving productivity of a device. Since the glass film has flexibility, the optical laminate also has flexibility. Therefore, the long optical laminate is provided as a roll. The length of the long optical laminate is preferably 100 m or more, more preferably 300 m or more, further preferably 500 m or more. The width of the long optical laminate is, for example, 50 to 3000 mm, preferably 100 to 2000 mm.

The optical laminate of the present invention can be applied to substrate materials for semiconductor elements, and optical devices such as display devices, illumination devices, smart windows and solar cells. In the optical device, the glass film may be used as a substrate material for forming an element or the like, or may be used as a cover glass for protecting a surface of a device.

The glass material has a surface gloss, and therefore by disposing the glass film on a surface of the image display device, an excellent glare feeling can be obtained. In addition, the glass material is optically isotropic, and therefore coloring of reflected light hardly occurs, so that high visibility can be attained. Further, the glass film has high surface hardness, and is thus excellent in impact resistance. Thus, in an image display device in which the optical laminate is arranged such that the glass film is on a viewing-side surface, the glass film performs a function as a front window, so that it is not necessary to place a window layer separately. Therefore, the process of manufacturing the image display device can be simplified, and the thickness and the weight of the device can be reduced due to reduction of the number of constituent members.

In the present invention, the number of contaminants in the adhesive layer arranged between the glass film and the resin film is small, and deformation (formation of projections) of a surface of the resin film, which is caused by the contaminants, is suppressed, so that optical defects in the optical device are unlikely to occur. Thus, by using the optical laminate of the present invention, an optical device excellent in visibility can be obtained. In addition, since the number density of coarse contaminants in the adhesive layer, or projections on a surface of the resin film, which are caused by the contaminants, is small, a sufficient yield can be secured even if a product including defects caused by the contaminants is excluded as a defective product in processing into a device size (e.g., screen size of a display).

EXAMPLES

Hereinafter, the present invention will be described more in detail by way of specific examples, but the present invention is not limited to the following specific examples.
[Evaluation 1: Effect of Reducing Number of Deposited Contaminants by Cleaning of Glass Film]

Comparative Example 1

A sample of 100 mm×100 mm was cut out from a roll of a 100 μm-thick glass film, the surface was observed with an optical microscope, and the total number of deposited contaminants of 5 μm or more in the observation range was counted. In addition, the number of deposited contaminants having a size of 100 μm or more was counted. This operation was performed on 100 samples (total area: 1 m²), and the total number of contaminants was determined.

Examples 1 to 3 and Comparative Examples 2 and 3

A glass film was unwound from the roll of the glass film, and a surface of the glass film was cleaned while being conveyed in one direction at a conveyance speed of 5 m/min. The cleaned glass film was once wound into a roll, and the number of contaminants per 1 m² was then determined by optical microscope observation in the same manner as in Comparative Example 1.

Example 1: Brush Cleaning

A surface of the glass film was cleaned with a web cleaner ("TURBO-SS" manufactured by SHINKO CO, .LTD.) equipped with a rotating brush and a vacuum cleaner.
The operating conditions were as follows:
Brush: made of nylon, length: 20 mm, thickness: 75 μm;
Brush rotation speed: 500 rpm (reverse rotation with respect to glass film conveyance direction);
Distance between brush and glass film: 1 mm; and
Blower operation condition: −3 kPa.

Example 2: Dry Ice Blast Cleaning

A surface of a glass film was cleaned by a dry ice blasting apparatus ("QuickSnow" manufactured by AIR WATER INC.) including a plurality of nozzles in the width direction (direction orthogonal to the conveyance direction). The operating conditions were as follows:
Dry ice particle size: 100 μmφ;
Air pressure: 0.4 MPa; and
Distance between nozzle and glass film: 20 cm.

Example 3: Two-Fluid Cleaning

A surface of a glass film was cleaned with a two-fluid cleaning apparatus having a plurality of two-fluid nozzles (manufactured by Spraying System Japan Co., Ltd.) in the width direction. The operating conditions were as follows:
Liquid: water;
Gas: compressed air;
Water pressure: 0.2 MPa;
Air pressure: 0.2 MPa; and
Distance between nozzle and glass film: 1 cm.

Comparative Example 2: Ultrasonic Cleaning

Cleaning was performed in water at normal temperature for 10 minutes using an ultrasonic cleaning apparatus ("8510 J-MTH" manufactured by Branson Ltd.).

Comparative Example 3: Pressure Sensitive Adhesive Roll

An adhesive roll ("BETALON" manufactured by MEIWA RUBBER CO., LTD.) was pressed against a surface of a glass film at a pressure of 0.2 MPa to clean the surface of the glass film.
<Evaluation of Product Yield>
The ratio at which optical laminates obtained by bonding a resin film to the glass film do not have contaminants of 100 μm or more and can be used as normal products (=product yield) when used for a display with a screen size of 15 inches (332 mm×187 mm) was calculated on the basis of the number of contaminants per 1 m². Table 1 shows the number of contaminants on the glass films of Examples 1 to 3 and Comparative Examples 1 to 3, and the calculated yields of the glass films.

TABLE 1

| | Cleaning method | Number of deposited contaminants (number/m²) | | Yield (%) |
| --- | --- | --- | --- | --- |
| | | 5 μm or more | 100 μm or more | |
| Example 1 | Brush | 500 | 1 | 93 |
| Example 2 | Blasting | 375 | 1 | 93 |
| Example 3 | Two-fluid body | 300 | 0 | 100 |
| Comparative Example 1 | Uncleaned | 5548 | 72 | 0 |
| Comparative Example 2 | Ultrasonic | 4287 | 36 | 0 |
| Comparative Example 3 | Pressure sensitive adhesive roll | 3465 | 44 | 0 |

As shown in Table 1, a large number of contaminants of 100 μm or more were deposited on an uncleaned glass film (Comparative Example 1), one or more contaminants of 100 μm or more are present per 15 inch size, and therefore the calculated value of the product yield was 0. In Comparative Example 2 where ultrasonic cleaning was performed and Comparative Example 3 where deposited contaminants were removed with a pressure sensitive adhesive roll, the number of deposited contaminants was smaller as compared to Comparative Example 1. However, the contaminant removing effect was not sufficient, and the calculated value of the yield for the 15 inch-size product was 0 as in Reference Example. It is apparent that in Examples 1 to 3, the deposited contaminants of 100 μm or more are appropriately removed, and therefore a high yield can be secured even when glass films including contaminants of 100 μm or more are considered as a defective product.

[Evaluation 2: Shape of Contaminant on Surface of Adhesive Layer]

An optical laminate was obtained by bonding 40 μm-thick acryl-based transparent film onto an uncleaned glass film with an epoxy-based adhesive interposed therebetween. Observed portions 1 to 5 where the presence of contaminants was confirmed by visual observation of the obtained optical laminate were evaluated in accordance with the following three criteria:

○: Usable for display applications (contaminants cannot be visually recognized as defects);

Δ: Usable for lightings although defects can be visually recognized; and

X: Unusable for either displays or lightings.

The optical laminate was immersed in water and heated to cause delamination at the interface between the adhesive layer and the acrylic transparent film, so that a sample for evaluation was prepared. For each of the observed portions 1 to 5, the size φ and the protrusion height H of the contaminant were determined, and the inclination angle θ was calculated from φ and H. The height H of the protrusion was calculated from the three-dimensional surface shape of the adhesive layer surface measured under the conditions of object lens magnification: 10 times, zoom lens magnification: 20 times and measurement area: 0.35 mm×0.26 mm with a coherence scanning interferometer (Zygo NewView 7300). In the analysis, a program installed in the apparatus was used to make corrections under the following conditions:

Removed: None;
Filter: High Pass;
Filter Type: Gauss Spline;
Low wavelength: 300 μm;
Remove spikes: on; and
Spike Height (xRMS): 2.5.

Table 2 shows size, protrusion height H and angle θ of each contaminants at observed portions 1 to 5, and results of visual evaluation. In the observed portion 5, contaminants were buried in the adhesive layer, and protrusions were not recognized.

TABLE 2

| Observed portion | φ (μm) | H (μm) | θ (°) | Visual evaluation |
|---|---|---|---|---|
| 1 | 72 | 8.3 | 13 | X |
| 2 | 190 | 5.3 | 3.2 | Δ |
| 3 | 86 | 5.9 | 7.8 | Δ |
| 4 | 83 | 6.1 | 8.4 | Δ |
| 5 | 50 | 0 | 0 | ○ |

In the observed portion 1, contaminants had a size φ smaller than that in each of the observed portions 2 to 4, but the contaminants were conspicuous as optical defects in the visual evaluation. On the other hand, in the observed portion 5, presence of contaminants was confirmed, but the contaminants did not protrude from the surface of the adhesive, and therefore were not recognized as optical defects in visual observation of the optical laminate.

The results shown in Table 2 reveal that even when the size of contaminants present in the adhesive layer arranged on the surface of the glass film is small, the contaminants are likely to be recognized as optical defects when the protrusion height from the surface of the adhesive layer and the inclination angle of the protrusion are large. It is apparent that on the contrary, even when there are contaminants, the contaminants are hardly recognized as optical defects when the protrusion from the surface of the adhesive layer is small (there is no protrusion).

DESCRIPTION OF REFERENCE SIGNS

10 Glass film
20 Resin film
30 Polarizer
50 Adhesive layer
80 Pressure sensitive adhesive layer
91 Separator
92 Surface protective film
101 Optical laminate

The invention claimed is:

1. An optical laminate comprising a glass film and a resin film laminated with each other, the glass film being flexible and having a thickness of 150 μm or less, wherein
the glass film has a first principal surface and a second principal surface,
the resin film is laminated on the first principal surface of the glass film with an adhesive layer interposed therebetween, and
a number of contaminants having a size of 100 μm or more in the adhesive layer is 10/m² or less;
wherein a number of contaminants having a size of 5 μm or more and less than 100 μm in the adhesive layer is 1300/m² or less.

2. The optical laminate of claim 1, wherein in the adhesive layer, a number of contaminants having a size of 100 μm or more and having a refractive index different from that of the adhesive layer by more than 0.02 is 5/m² or less.

3. An optical laminate comprising a glass film and a resin film laminated with each other, the glass film being flexible and having a thickness of 150 μm or less, wherein
the glass film has a first principal surface and a second principal surface,
the resin film is laminated on the first principal surface of the glass film with an adhesive layer interposed therebetween, and
a number of contaminants in which a height of a protrusion from a resin film-side surface of the adhesive layer is 7 μm or more is 10/m² or less.

4. An optical laminate comprising a glass film and a resin film laminated with each other, the glass film being flexible and having a thickness of 150 μm or less, wherein
the glass film has a first principal surface and a second principal surface,
the resin film is laminated on the first principal surface of the glass film with an adhesive layer interposed therebetween, and
a number of contaminants in which an inclination angle of a protrusion from a surface on a resin film-side of the adhesive layer is 10° or more is 10/m² or less.

5. The optical laminate according to claim 4, wherein
a number of contaminants in which a height of a protrusion from a resin film-side surface of the adhesive layer is 7 μm or more is 10/m² or less.

6. The optical laminate according to claim 1, including a polarizer as the resin film.

7. The optical laminate according of claim 6, wherein a transparent resin film is laminated on the first principal surface of the glass film with the adhesive layer interposed therebetween, and the polarizer is laminated on the transparent resin film.

8. The optical laminate according to claim 3, wherein
a number of contaminants having a size of 100 μm or more in the adhesive layer is $10/m^2$ or less.

9. The optical laminate according to claim 3, including a polarizer as the resin film.

10. The optical laminate according of claim 9, wherein a transparent resin film is laminated on the first principal surface of the glass film with the adhesive layer interposed therebetween, and the polarizer is laminated on the transparent resin film.

11. The optical laminate according to claim 4, wherein
a number of contaminants having a size of 100 μm or more in the adhesive layer is $10/m^2$ or less.

12. The optical laminate according to claim 4, including a polarizer as the resin film.

13. The optical laminate according of claim 12, wherein a transparent resin film is laminated on the first principal surface of the glass film with the adhesive layer interposed therebetween, and the polarizer is laminated on the transparent resin film.

* * * * *